United States Patent [19]

Shindelar

[11] 4,373,551
[45] Feb. 15, 1983

[54] DRIPLESS COUPLER

[75] Inventor: Aloysius C. Shindelar, Hudson, Iowa

[73] Assignee: Deere & Company, Moline, Ill.

[21] Appl. No.: 224,598

[22] Filed: Jan. 12, 1981

[51] Int. Cl.³ .......................................... F16L 37/28
[52] U.S. Cl. ........................... 137/614.06; 137/614.04;
 137/614.05; 137/627.5
[58] Field of Search .............. 137/614, 614.05, 614.06,
 137/614.04, 614.03, 627.5, 596.2; 251/149.6,
 149.9

[56] References Cited

U.S. PATENT DOCUMENTS

| | | | |
|---|---|---|---|
| 695,839 | 3/1902 | Roberts et al. | 137/596.2 |
| 3,036,595 | 5/1962 | Rogers | 91/432 |
| 3,213,884 | 10/1965 | Moyer et al. | 137/614.03 |
| 3,301,272 | 1/1967 | Pettyjohn et al. | 137/614.06 |
| 3,348,575 | 10/1967 | Simak | 137/614.05 |
| 3,464,436 | 9/1969 | Bruning | 137/237 |
| 4,181,150 | 1/1980 | Maldavs | 137/614.06 |
| 4,221,235 | 9/1980 | Maldavs | 137/614.04 |
| 4,249,572 | 2/1981 | Shindelar | 137/614.04 |
| 4,303,098 | 12/1981 | Shindelar | 137/614.06 |

OTHER PUBLICATIONS

Machine Design, Aug. 11, 1977, vol. 49, No. 18, "The Right Way to Select Quick Disconnects", by Wayne Wilcox, pp. 86-90.

Primary Examiner—A. Michael Chambers

[57] ABSTRACT

A dripless coupler containing a female and a male coupler, the female coupler retained within a housing. The female coupler includes a receptacle enclosing a cavity having an inlet port, an outlet port and an open bore located at one end thereof. Positioned between the receptacle and the open bore is a movable seat which mates with a flat smooth end surface of the main poppet valve which is retained within the cavity. The main poppet valve is normally biased to a closed position against the movable seat. Insertable into the open bore of the female coupler is the male coupler which includes a receptacle enclosing a cavity with an inlet opening. Positioned within the inlet opening is a movable check valve having a flat outer end surface which is mateable with the end surface of the main poppet valve. When the male and female end surfaces join, a flush surface results which prevents the leakage of hydraulic fluid during the uncoupling operation.

19 Claims, 6 Drawing Figures

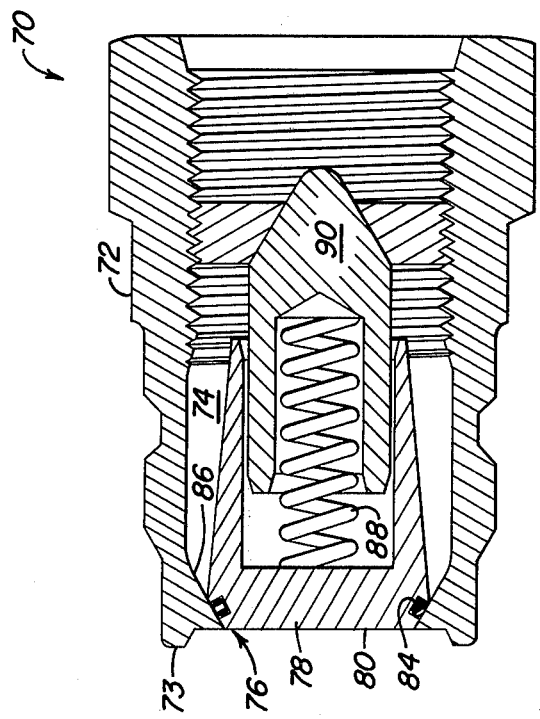

DRIPLESS COUPLER

BACKGROUND OF THE INVENTION

1. Field of the Invention

This invention relates to a dripless coupler for coupling to and uncoupling from two hydraulic functions while preventing spillage of oil during the uncoupling operation and requiring limited pressure to be disconnected.

2. Description of the Prior Art

Numerous hydraulic couples are available on the market today which can be used to connect hydraulic lines together. Such couplers are used in a wide variety of applications including use on agricultural and industrial type tractors wherein a tractor is hydraulically connected to a towed implement. One of the major drawbacks with the current hydraulic couplers is that they tend to leak oil while being disconnected. This leaked oil flows down the rear of the tractor and attracts foreign matter such as dirt. The presence of a dirty oily surface on the rear of the tractor is undesirable because the dirt has the potential of entering the hydraulic lines and contaminating them.

One coupler which partially solved this problem was taught by applicant in an earlier patent application, U.S. Pat. No. 4,303,098 which is made a part of this application and is incorporated by reference. This particular coupler was easy to disconnect and allowed only a limited amount of spillage during the uncoupling process. Other couplers which prevent dripping or spillage during the uncoupling process were described in the Aug. 11, 1977 issue of "Machine Design" magazine on pages 86-90. This article, which was written by an engineer at Snap-Tite, Inc., describes couplers that have spillage rates of less than several cubic centimeters during the uncoupling operation. However, the acceptability of these couplers has been minimal because a significant amount of pressure is required to disconnect. These couplers also differ in physical design and construction with most using sliding seals versus flush poppet seals. Now a dripless coupler has been invented which prevents spillage of oil during the uncoupling operation while requiring only limited pressure to be disconnected.

SUMMARY OF THE INVENTION

Briefly, this invention relates to a dripless coupler for joining or unjoining two hydraulic functions. The dripless coupler includes a housing which retains a female coupler. The female coupler includes a receptacle which encloses an elongated cavity having an inlet port, and outlet port and an open bore located at one end. Within the open bore is a movable seat which cooperates with a main poppet valve which is movably positioned within the elongated cavity. The movable seat and a flat end surface of the main poppet valve mate with each other so as to block fluid flow through the open bore. A male coupler is insertable into the open bore of the female coupler. This male coupler includes a receptacle enclosing a cavity with an inlet opening and a movable check valve positioned therein. The check valve has a flat outer end surface which is mateable with the flat end surface of the main poppet valve of the female coupler. When the male coupler is inserted into the open bore of the female coupler, a flush surface results which prevents the leakage of hydraulic oil during the uncoupling operation.

The general object of this invention is to provide a dripless coupler which prevents the spillage of oil during the uncoupling operation, yet requires a minimum amount of pressure to be disconnected. A more specific object of this invention is to provide a dripless coupler with a lever-actuatable cam for reducing the amount of pressure required to disconnect.

Another object of this invention is to provide a dripless coupler which incorporates a female coupler and a male coupler both of which have flat outer abutting end surfaces.

Still another object of this invention is to provide a dripless coupler which employs a piston in the female coupler which is able to overcome pressure differentials which occur by the expansion of hydraulic fluid in the male coupler.

A further object of this invention is to provide a reliable and inexpensive dripless coupler.

Still further, an object of this invention is to provide a dripless coupler which uses sliding seals.

Other objects and advantages of the present invention will become more apparent when considered in connection with the following description and the drawings.

BRIEF DESCRIPTION OF THE DRAWINGS

FIG. 6 is a sectional view of the male portion of the dripless coupler of FIG. 1 in a closed position.

DETAILED DESCRIPTION OF THE PREFERRED EMBODIMENT

Figure 1:
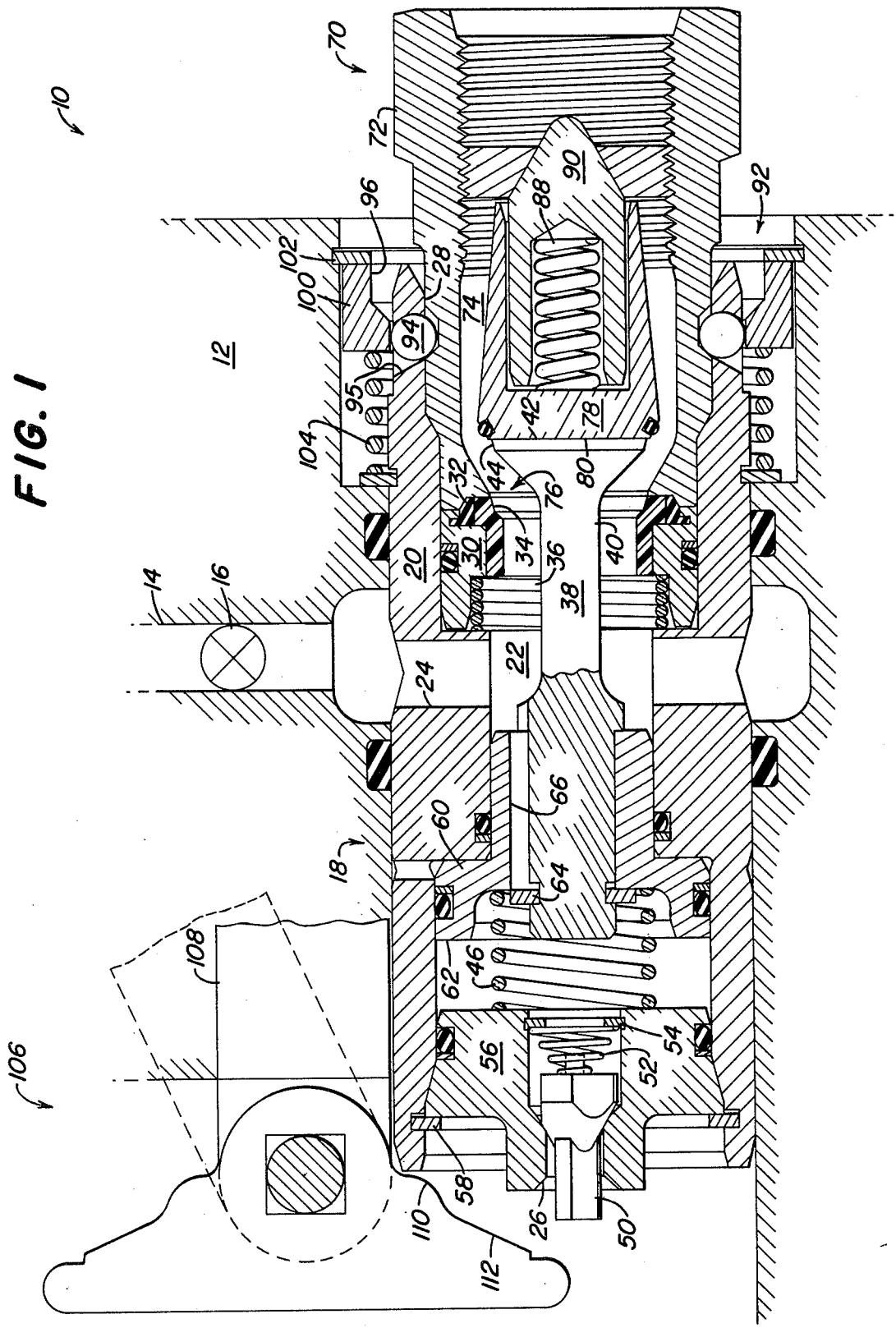
FIG. 1 is a sectional view of a dripless coupler having a male coupler attached to the female coupler and showing the main valve in an open position.
Figure 2:
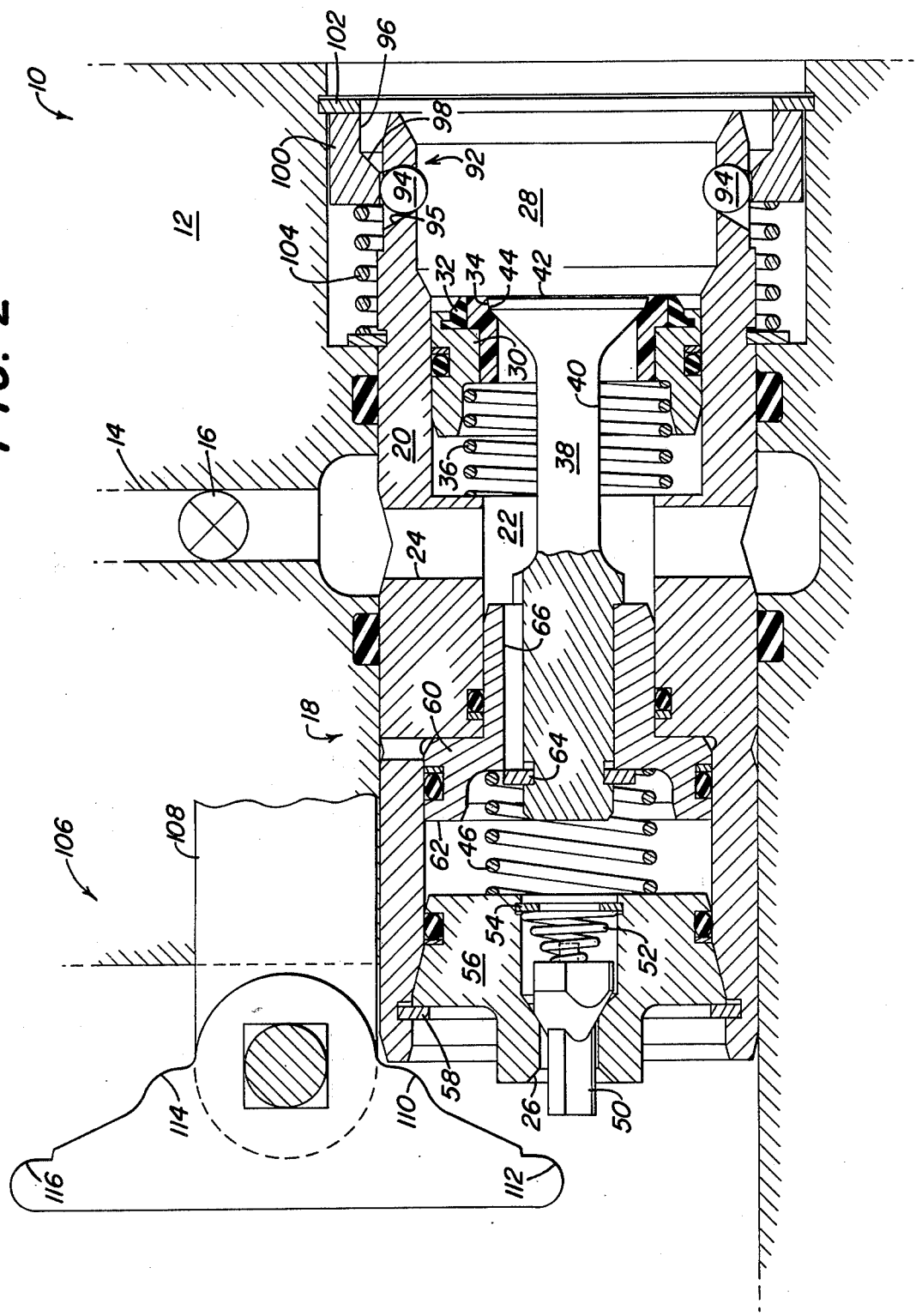
Fig. 2 is a sectional view of the female portion of the dripless coupler of FIG. 1, showing the main valve in a closed position.

Referring to FIGS. 1 and 2, a dripless coupler 10 is shown having a housing 12 into which is formed a conduit 14 having a control valve 16. The conduit 14 is connected to a reservoir, not shown, containing a quantity of hydraulic fluid. Movably retained within the housing 12 is a female coupler 18 which is comprised of a receptacle 20 enclosing an elongated cavity 22, an inlet port 24, an outlet port 26 and an open bore 28. The open bore 28 is located at one end of the elongated cavity 22. Positioned within the open bore 28 is a slidable sleeve 30 which supports a face seal 32 and a seat 34. This slidable sleeve 30 is spring-biased by a compression spring 36 so as to be medially positioned within the open bore 28. Also contained within the female coupler 18 is a main valve 38 such as a poppet valve. This main valve 38 contains a stem 40 which mushrooms out to a flat outer end surface 41 having a beveled peripheral surface 44. The main valve 38 is normally biased by a compression spring 46 to a closed position wherein the beveled peripheral surface 44 mates with the seat 34 on the slidable sleeve 30. When the main valve 38 is mated with the seat 34, fluid flow is blocked through the open bore 28.

Figure 3:
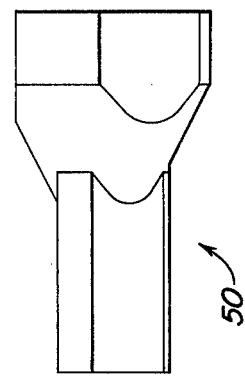
FIG. 3 is an enlarged side view of the secondary valve means.
Figure 4:
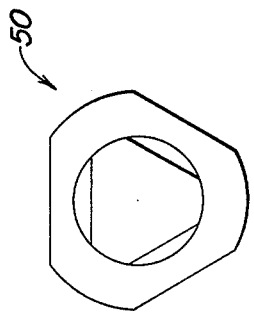
FIG. 4 is an enlarged left end view of the secondary valve means shown in FIG. 3.

The female coupler 18 also includes a secondary valve 50, see FIGS. 3 and 4, which is biased by a spring 52 to a closed position and is held in place by a retension ring 54. In the closed position, fluid flow is blocked through the outlet port 26. The outlet port 26, which is preferably circular in cross-sectional shape, is formed in an end cap 56 and is held in place by a retaining ring 58. Lastly, a piston 60 is positioned adjacent to the main valve 38 and serves in assisting in moving the main valve 38 to the right in order to open the main valve 38 against fluid pressure. For purposes of convenience, and not by way of limitation, the viewer's right will be taken as the right-hand side of the dripless coupler 10.

Figure 5:
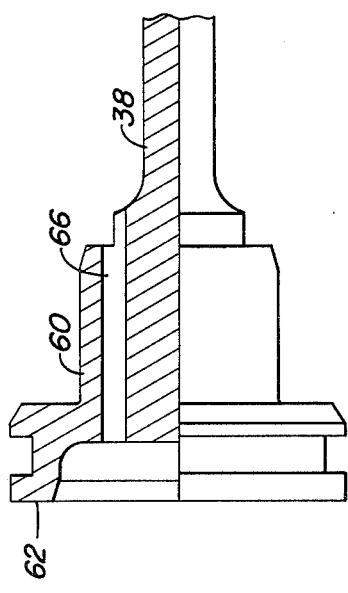
FIG. 5 is an enlarged partial side view of an alternative design for the main valve with an attached piston.

The piston 60 is shaped like a collar and has a flat exposed surface 62 against which pressurized fluid can impinge. The piston 60 can be either joined to the main valve 38 by an attachment 64, such as retaining ring, or the piston 60 can be integral with the main valve 38 such as is shown in FIG. 5. In either case, a passageway or groove 66 is formed between the piston 60 and the main valve 38 so that fluid can flow between the inlet opening 24 and outlet opening 26.

A male coupler 70, which is attached to a hydraulic hose and thereby connected to some hydraulic function, is insertable into the open bore 28 of the female coupler 18. This male coupler 70, see FIGS. 1 and 6, is comprised of a receptacle 72 which encloses a cavity 74 having an inlet opening 76. Positioned within the cavity 74 is a movable check valve 78 which is capable of blocking the inlet opening 76. This check valve 78 contains a flat outer end surface 80 peripherally surrounded by a beveled seat 82 which contains a seal 84. The beveled seat 82 and the seal 84 will mate with an internal shoulder 86 on the interior surface of the receptacle 72. The male check valve 78, preferably a poppet type check valve, is spring-loaded by a compression spring 88 which is positioned against a stop 90. The spring 88 ensures that the male check valve 78 will be normally closed so that the beveled seat 82 is mating with the interior shoulder 86. This closed position ensures that hydraulic fluid can be retained within the male coupler 70 and its attached hydraulic hose.

When the male coupler 70 is inserted into the open bore 28 of the female coupler 18, the flat end surface 80 will form a flush surface with the flat end surface 42 of the female coupler 18. This flush contact ensures that no leakage of oil will occur when the male coupler 70 is separated from the female coupler 18.

The male coupler 70 is normally inserted into the open bore 28 of the female coupler 18 and is retained in place by attachment 92. One type of attachment 92 is shown in FIGS. 1 and 2 but other methods may be used which may work just as well. The attachment 92 includes a plurality of engagement balls 94 and openings 95 spaced about the inner periphery of the open bore 28. These engagement balls 94 are positioned so as to be rollably received in a race 96 having a slanted side wall 98. The race 96 is formed in a sleeve 100 which is retained in position by a retaining ring 102 and a compression spring 104. As the male coupler 70 is inserted into the open bore 28, the engagement balls 94 will move outward into the race 96. However, the spring force on the sleeve 100 will always urge the engagement balls 94 back into the openings 95 thereby creating a gripping action. This gripping or frictional contact between the engagement balls 96 and the receptacle 72 will hold the male coupler 70 in the open bore 28.

In order to assist in coupling the male coupler 70 to the female coupler 18, a lever-actuatable cam 106 is pivotally mounted to the housing 12 approximate at the left-hand end of the female coupler 18. This lever-actuatable cam 106 includes a lever arm 108, and at least two cam lobes 110 and 112. For the sake of simplicity, the lever-actuatable cam 106 will be described as initially having the lever 108 in the horizontal position wherein it is capable of being raised up. By raising the lever 108 up, the cam lobe 110 will contact the left-hand end of the receptacle 20 as the cam lobe 112 sequentially or shortly thereafter contacts the left-hand end of the secondary valve 50. As the lever 108 is raised up further, the cam lobe 110 will move the receptacle 20 to the right thereby allowing the engagement balls 94 to enter the race 96. At the same time or shortly thereafter, the secondary valve 50 will open so that any pressure within the cavity 22 can be released and drained to a sump, not shown.

An alternative embodiment of the lever-actuatable cam 106 is shown in FIG. 2 wherein four cam lobes 110, 112, 114 and 116 are depicted. Such an embodiment allows two female couplers, only one of which is shown, to be actuated with the one lever 108. In this arrangement, movement of the lever 108 above the horizontal position will activate a lower female coupler (shown) and movement of the lever 108 below the horizontal position will activate an upper female coupler (not shown). Other arrangements and designs will be apparent to those skilled in the art.

The primary purpose of the lever-actuatable cam 106 is to facilitate the coupling and uncoupling of the male coupler 70 to and from the female coupler 18. The lever-actuatable cam 106 can be manually or mechanically operated and is especially useful when the male coupler 70 is pressurized.

Numerous seals such as O-rings and teflon rings are utilized within the female portion of the dripless coupler 10 to prevent leakage between various elements. These seals have not been discussed in detail since their function is well known to those skilled in the art and their position may vary slightly without materially affecting the operability of the dripless coupler 10.

OPERATION

The operation of the dripless coupler 10 will be explained for coupling in a pressurized and a non-pressurized situation, and uncoupling in a pressurized and non-pressurized situation.

Coupling in a Non-pressurized Situation

When a non-pressurized male coupler 70 is to be attached to the female coupler 18, the procedure is as follows. Starting with the main valve 38 in a closed position, wherein fluid flow through the open bore 28 as blocked, is depicted in FIG. 2, and with no incoming flow of fluid to the inlet port 24, the operator raises the lever 108. This action causes the cam lobe 110 to contact the left end of the receptacle 20 and moves it to the right. As the receptacle 20 moves to the right, the plurality of balls 94 will roll partially out of the sockets 95 and into the groove 96. With the balls 94 in the groove 96, an unobstructed path is available for the male coupler 70 and it can be inserted with little effort. In this position, the compression spring 104 is compressed and in turn it will exert a leftward force on the sleeve 100 causing the receptacle 20 to move to the left as the lever 108 is released. The receptacle 20 will therefore try to return to its initial position once the lever 108 is lowered.

As the lever 108 is raised slightly, the second cam lobe 112 will contact the left end of the secondary valve 50 and move it to the right. This action causes the secondary valve 50 to open and any fluid which may be present within the cavity 22 can seep out. It should be noted that the movement of the secondary valve 50 is prior to the time the plurality of balls 94 move into the race 96. This action assures that a small quantity of non-pressurized fluid will remain within the cavity 22. The operator then inserts the male coupler 70 into the open bore 28 while holding the lever arm 108 in a raised position. Once the male coupler 70 has been inserted, the lever 108 is released to its original position. The lowering of the lever 108 will cause the cam lobes 110 and 112 to move away from both the secondary valve 50 and the receptacle 20. The receptacle 20 will then move leftward due to the force in the compression spring 104. As the receptacle 20 moves leftward, the plurality of balls 94 will roll out of the groove 96 and return to the sockets 95 to the extent that they frictionally contact the outer circumference of the male receptacle 72. This frictional contact is sufficient to hold the male coupler 70 in the open bore 28.

For purposes of convenience, and not by way of limitation, the viewers right will be taken as the right-hand side of the dripless coupler 10.

As the male coupler 70 is inserted into the open bore 28, the left-hand end 73 of the receptacle 72 will contact the slidable sleeve 30 and force it to the left. The slidable sleeve 30 will be forced to the left rather than the main valve 38 because the force within the compression spring 36 is less than the force within the spring 46. At the same time as the left end surface 73 is contacting the slidable sleeve 30, the flat outer end surface 80 of the male check valve 78 will contact the flat outer end surface 42 of the female main valve 38. The movement of the male check valve 78 to the right will occur depending upon the force between the spring 88 and the spring 46. Since the spring 46 is designed to be stronger then the spring 88, the male check valve 72 will move to the right in the non-pressurized situation. A passageway will then be opened between the male coupler 70 and the female coupler 80 and fluid can flow therebetween as soon as the control valve 16 is open.

It should be noted that fluid flow between the male coupler 70 and the female coupler 18 can be in either direction, that is from the male coupler 70 to the female coupler 18 out through the conduit 14 or vice versa. A small quantity of fluid will flow through the slot 66 to the left-hand side of the piston 60 but will not be able to flow out the outlet port 26 because the secondary valve 50 is normally spring-biased to a closed position by spring 52 and the secondary valve 50 and the outlet port 26 is only open when the cam 112 exerts a rightward force on the secondary valve 50. Flow will continue through the dripless coupler 10 until the operator terminates such flow by closing the valve 16.

Uncoupling in a Non-pressurized Situation

To uncouple the dripless coupler 10 in a non-pressurized situation, the operator shuts off the flow of fluid by closing the control valve 16. The lever 106 is then raised which causes the cam lobe 110 to again push the receptacle 20 to the right. The plurality of balls 94 will then enter the groove 96 and the male coupler 70 is free to be withdrawn. Just prior to the disengagement of the balls 94 from the circumference of the male receptacle 72, the second cam lobe 112 will contact the left side end of the secondary valve 50 and also push it to the right. This action opens the outlet port 26 and releases any pressurized fluid within the cavity 22. As the male coupler 70 is removed from the open bore 28, the slidable sleeve 30 which is spring-biased to the right by spring 36 will follow the outward movement of the receptacle 72. This movement will continue until the slidable sleeve 30 mates with the beveled peripheral surface 44 of the main valve 38. At this instance, fluid to the left of the beveled peripheral surface 44 will be contained within a female coupler 18 and fluid to the right of the beveled peripheral surface 44 will be retained in the male coupler 70. At the same time as the bevel peripheral surface 44 mates or seats with the seat 34, the seal 84 on the male check valve 78 will seat against the shoulder 86 on the interior of the male receptacle 72. The location of the seal 84 relative to the outer end surface of the check valve 78 assures that essentially no leakage or entrapment of fluid will occur during the uncoupling process. Once the male coupler 70 is withdrawn, the lever 106 is released to its original position thereby allowing the secondary valve 50 to close the outlet port 26 and the uncoupling process is completed.

Coupling in a Pressurized Situation

When coupling the female coupler 18 to a pressurized male coupler 70 the process is slightly different in that the higher fluid pressure in the male end will prevent the check valve 78 from opening when the receptacle 72 is fully inserted into the open bore 28. This means that the female coupler 18 and the movable main valve 38 is in its leftmost position and is still seated against the seat 34. The movement of the main valve 38 to the left causes the piston 60 to also move to the left but the piston 60 will never be moved so far to the left as to be flush with the end cap 56.

In order to open the male check valve 78, the pressure within the cavity 22 has to be increased. This is accomplished as the operator returns the lever 106 to its original position and opens the control valve 16. As pressurized fluid flows into the inlet port 24, it will only have one avenue of passage, that being through slot 66 to the area between the end cap 56 and the piston 62. As the internal pressure increases, it will impinge on the large flat surface 62 of the piston 60 and cooperate with the force in the compression springs 56 to drive the main valve 38 to the right. When the force exerted on the left end of the main valve 38 is greater than the force holding the male check valves 72 in a closed position, the main valve 38 will cause the male check valve 72 to move to the right. This action will open the passageway between the male coupler 70 and the female coupler 18 and fluid flow in either direction will occur.

The pressure required in the female coupler 18 to move the piston 60 to the right is considerably less than the fluid pressure within the male coupler 70.

Uncoupling in a Pressurized Situation

The uncoupling of a pressurized male coupler from the female coupler 18 is identical to the process described above for the non-pressurized uncoupling situation.

While the invention has been described in conjunction with a specific embodiment, it is to be understood that many alternatives, modifications and variations will be apparent to those skilled in the art in light of the aforegoing description. Accordingly, it is intended to embrace all such alternatives, modifications and variations which fall within the spirit and scope of the appended claims.

I claim:
1. A dripless coupler comprising:
(a) a housing having a fluid passage formed therein;
(b) a female coupler movably retained in said housing, said female coupler including a receptacle enclosing a cavity having an inlet port communicating with said fluid passage formed in said housing, an open bore located at one end of said cavity and an outlet port axially aligned with said open bore, a movable seat positioned in said open bore portion of said receptacle, main valve means mateable with said movable seat for blocking fluid flow through said open bore, said main valve means having a flat end surface, and secondary valve means for controlling fluid flow through said outlet port;
(c) a male coupler insertable into said open bore portion of said female coupler, said male coupler including a receptacle enclosing a cavity having an inlet opening in which a movable check valve is positioned, said check valve having a flat end surface mateable with said flat end surface of said main valve means located in said male coupler;
(d) movable piston means for assisting in moving said main valve means against fluid pressure contained in said male coupler; and
(e) lever-actuatable cam means for moving both said receptacle of said female coupler and said secondary valve means, said lever-actuatable cam means being pivotally attached to said housing.

2. The dripless coupler of claim 1 wherein said main valve means and said secondary valve means are axially aligned.

3. The dripless coupler of claim 2 wherein said main valve means is a poppet valve.

4. The dripless coupler of claim 2 wherein said piston means is slidable within said cavity of said female coupler.

5. The dripless coupler of claim 4 wherein said piston means is spring biased away from said outlet port.

6. The dripless coupler of claim 1 wherein said movable seat is movable independent of movement of said main valve means.

7. The dripless coupler of claim 1 wherein said movable seat is movable independent of movement of said female receptacle.

8. The dripless coupler of claim 1 wherein said movable seat is spring biased away from said receptacle.

9. A dripless coupler comprising:
(a) a housing;
(b) a female coupler movably retained in said housing, said female coupler including a receptacle enclosing an elongated cavity having an inlet port, an outlet port and an open bore located at one end of said cavity opposite to said outlet port, a main poppet valve movably positioned within said elongated cavity having a stem with a flat outer end surface, a slidable sleeve positioned in said open bore between said receptacle and said main poppet valve, said sleeve supporting a seat which cooperates with said main poppet valve to block fluid flow through said open bore, a secondary poppet valve positioned in said outlet port for controlling fluid flow therethrough, and piston means for assisting in moving said main poppet valve against fluid pressure, said piston means surrounding a portion of said main poppet valve and positioned away from said seat;
(c) a male coupler insertable into said open bore of said female coupler, said male coupler including a receptacle enclosing a cavity having an inlet opening in which a movable check valve is positioned, said check valve having a flat outer end surface mateable with said flat outer end surface of said main poppet valve; and
(d) lever-actuatable cam means for moving both said receptacle of said female coupler and said secondary poppet valve, such that movement of said female coupler toward said male coupler facilitates disconnection therebetween and movement of said secondary poppet valve inward into said cavity of said female coupler permits release of pressurized fluid from said cavity which aids in obtaining a dripless disconnection.

10. The dripless coupler of claim 9 wherein said piston means is positioned within said cavity between said main poppet valve and said secondary poppet valve and has a large flat surface on which fluid can impinge.

11. The dripless coupler of claim 9 wherein said piston means is integral with said main poppet valve when said piston means moves towards said outlet port.

12. A dripless coupler comprising:
(a) a housing;
(b) a female coupler movably retained in said housing, said female coupler including a receptacle enclosing an enlongated cavity having an inlet port, an outlet port and an open bore located on one end of said cavity which is axially aligned with said outlet port, a main poppet valve movably positioned within said elongated cavity having a stem with a flat outer end surface, a slidable sleeve positioned in said open bore between said receptacle and said flat end surface of said main poppet valve, said sleeve supporting a seat which cooperates with said main poppet valve to block fluid flow through said open bore, a secondary poppet valve positioned in said outlet port for controlling fluid flow therethrough, and piston means surrounding a portion of said main poppet valve and positioned away from said seat for assisting in opening said main poppet valve against said fluid pressure;
(c) a male coupler insertable into said open bore of said female coupler, said male coupler including a receptacle enclosing a cavity having an inlet opening in which a movable check valve is positioned, said check valve having a flat outer end surface mateable with said flat outer end surface of said main poppet valve; and
(d) lever-actuatable cam means pivotally attached to said housing for moving both said secondary poppet valve and said receptacle of said female coupler such that movement of said receptacle toward said male coupler facilitates disconnection therebetween and movement of said secondary poppet valve inward into said cavity of said female coupler permits release of pressurized fluid from said cavity which aids in obtaining a dripless disconnection.

13. A dripless coupler comprising:
(a) a housing;
(b) a female coupler movably retained in said housing, said female coupler including a receptacle enclosing a cavity having an inlet port communicating with said cavity, an open bore located at one end of said cavity and an outlet port axially aligned with said open bore, a slidable seat positioned in said open bore portion of said receptacle, main valve means mateable with said slidable seat for blocking fluid flow through said open bore, said main valve means having a flat end surface, and secondary valve means for controlling fluid flow through said outlet port, said secondary valve means being axially aligned with said main valve means;

(c) a male coupler insertable into said open bore portion of said female coupler, said male coupler including a receptacle enclosing a cavity having an inlet opening at one end thereof in which a movable check valve is positioned, said check valve being spring biased to a normally closed position and having a flat end surface mateable with said flat end surface of said main valve means located in said female coupler;

(d) a movable piston positioned within said cavity of said female coupler and surrounding a portion of said main valve means, said piston being spring biased away from said outlet port and activated by fluid pressure to lift said main valve means from said seat when said check valve in said male coupler is seated and under pressure to stay seated;

(e) a lever-actuatable cam member pivotally attached to said housing and movable into contact with both an end of said female coupler and said secondary valve means, such that movement of said female coupler toward said male coupler facilitates disconnection therebetween and movement of said secondary valve means inward into said cavity of said female coupler permits release of pressurized fluid from said cavity which aids in obtaining a dripless disconnection.

14. The dripless coupler of claim 13 wherein said inlet port is arranged between said outlet port and said open bore portion of said female coupler.

15. The dripless coupler of claim 13 wherein said main valve means is a poppet valve.

16. The dripless coupler of claim 13 wherein said slidable seat is movable independent of movement of said female receptacle.

17. The dripless coupler of claim 13 wherein said slidable seat is spring biased away from said receptacle.

18. The dripless coupler of claim 13 wherein means are provided for holding said male coupler in said open bore of said female bore.

19. The dripless coupler of claim 13 wherein said piston means contains a passage therein fluidly connecting said inlet port with said outlet port.

* * * * *

UNITED STATES PATENT AND TRADEMARK OFFICE
CERTIFICATE OF CORRECTION

PATENT NO. : 4,373,551

DATED : 15 February 1983

INVENTOR(S) : Aloysius C. Shindelar

It is certified that error appears in the above-identified patent and that said Letters Patent is hereby corrected as shown below:

Column 7, line 26, delete "male" and insert -- female --.

Signed and Sealed this

Thirteenth Day of December 1983

[SEAL]

Attest:

GERALD J. MOSSINGHOFF

*Attesting Officer*     *Commissioner of Patents and Trademarks*